(12) United States Patent
Oh

(10) Patent No.: US 7,321,665 B2
(45) Date of Patent: Jan. 22, 2008

(54) METHOD OF AND APPARATUS FOR EXTRACTING WATERMARK FROM REPEATEDLY WATERMARKED DATA

(75) Inventor: Sang-heun Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 804 days.

(21) Appl. No.: 10/463,852

(22) Filed: Jun. 18, 2003

(65) Prior Publication Data

US 2004/0042636 A1 Mar. 4, 2004

(30) Foreign Application Priority Data

Jun. 18, 2002 (KR) ............... 10-2002-0034137

(51) Int. Cl.
*G06K 9/00* (2006.01)
*H04N 1/40* (2006.01)
*H04L 9/00* (2006.01)

(52) U.S. Cl. ............. 382/100; 358/3.28; 713/176

(58) Field of Classification Search ........ 382/100; 358/3.28; 713/176
See application file for complete search history.

(56) References Cited

U.S. PATENT DOCUMENTS

| | | | |
|---|---|---|---|
| 5,915,027 A * | 6/1999 | Cox et al. ............... | 380/54 |
| 6,505,223 B1 * | 1/2003 | Haitsma et al. ......... | 708/403 |
| 6,671,388 B1 * | 12/2003 | Op De Beeck et al. .... | 382/100 |
| 6,704,431 B1 * | 3/2004 | Ogawa et al. ........... | 382/100 |
| 6,731,775 B1 * | 5/2004 | Ancin .................. | 382/100 |
| 6,826,290 B1 * | 11/2004 | Murakami et al. ....... | 382/100 |
| 2002/0172398 A1 * | 11/2002 | Hayashi ................ | 382/100 |
| 2002/0180995 A1 * | 12/2002 | Yen et al. .............. | 358/1.9 |
| 2006/0193491 A1 * | 8/2006 | Nakamura et al. ....... | 382/100 |

FOREIGN PATENT DOCUMENTS

JP 2000-151968 5/2000
JP 2001-119561 4/2001

OTHER PUBLICATIONS

Chinese Office Action (Second) dated Nov. 25, 2005 issued in Chinese Patent Application No. 03148671.1.
Japanese Office Action dated Oct. 4, 2005 issued in co-pending Japanese Patent Application No. 2003-151350.

\* cited by examiner

*Primary Examiner*—Andrew W. Johns
*Assistant Examiner*—Anthony Mackowey
(74) *Attorney, Agent, or Firm*—Stein, McEwen & Bui, LLP

(57) ABSTRACT

A method of extracting a watermark from watermarked data includes extracting a plurality of watermarks from the watermarked original data, calculating reliability of each of the extracted watermarks, and determining a final watermark based on the calculated reliability of each of the extracted watermarks.

26 Claims, 7 Drawing Sheets

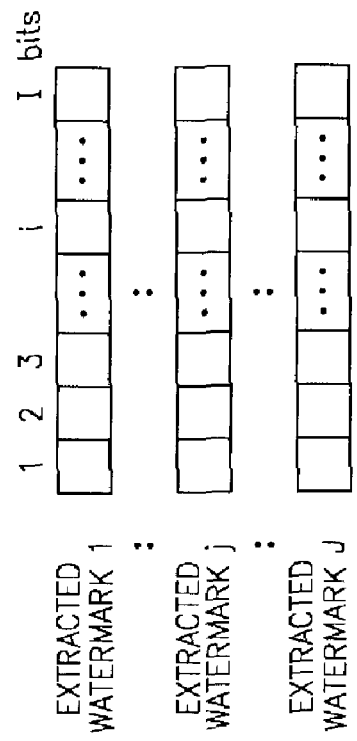
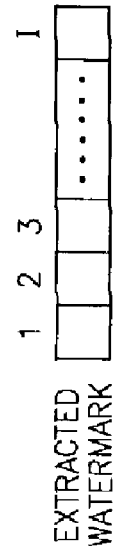
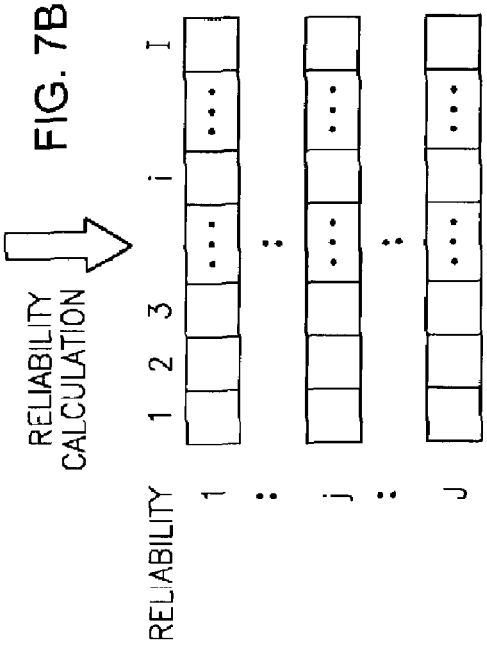
FIG. 7A  FIG. 7B  FIG. 7C

METHOD OF AND APPARATUS FOR EXTRACTING WATERMARK FROM REPEATEDLY WATERMARKED DATA

CROSS-REFERENCE TO RELATED APPLICATION

This application claims the benefit of Korean Patent Application No. 2002-34137, filed on Jun. 18, 2002 in the Korean Intellectual Property Office, the disclosure of which is incorporated herein in its entirety by reference.

BACKGROUND OF THE INVENTION

1. Field of the Invention

The present invention relates to a watermark, and more particularly, to a method of and an apparatus for extracting a watermark from repeatedly watermarked data.

2. Description of the Related Art

Due to developments in network-based communications techniques, it has become more frequent to store and transmit multimedia data in a digital format. However, for digital data, it is almost impossible to differentiate original data from copies. Accordingly, predetermined identification information (hereinafter referred to as a "watermark") needs to be inserted into the original data so that one can identify and/or insist upon one's right to the original data. The predetermined identification information (i.e., the watermark) includes copyright information on the original data, copyrighter's signatures, and other marks.

Generally, a watermark is repeatedly inserted into the original data, and then the repeatedly watermarked data is transmitted. Therefore, even though some of the values of the watermarks inserted into the original data are damaged due to errors occurring during the transmission of the repeatedly watermarked data, data processing, or due to intentional attacks on the original data, it is still possible to extract a complete watermark from the repeatedly watermarked digital data having other intact watermarks. A majority rule manner has been used to select the watermark from among the plurality of watermarks having different values due to errors.

FIGS. 1A and 1B are diagrams illustrating a method of repeatedly inserting a watermark into original data and then transmitting the repeatedly watermarked data. Referring to FIG. 1A, at a sending terminal, a watermark of "101010" is inserted into original data three times so that watermarks 1 through 3 are located at different places of the original data. Thereafter, the watermarked data is transmitted. However, due to attacks against the watermarked data while in a transmission channel, damaged watermarks 1 through 3 are detected at a receiving terminal.

In FIG. 1B, a damaged portion of a watermark is represented with shading lines. In particular, as shown in FIG. 1B, the watermarks 1 and 2 are damaged so that "1010" is deformed into "0101". Therefore, according to the majority rule method of determining a final watermark, "010110" rather than the original watermark "101010" is determined as the final watermark.

As described above, according to the conventional method of determining a final watermark using the majority rule manner, wrong bit values are more likely to be selected as bit values constituting the final watermark, especially when watermarked data is severely damaged.

SUMMARY OF THE INVENTION

The present invention provides a method of and an apparatus for extracting a watermark from repeatedly watermarked data even when the watermarked data is severely damaged.

Additional aspects and/or advantages of the invention will be set forth in part in the description which follows and, in part, will be obvious from the description, or may be learned by practice of the invention.

According to an aspect of the present invention, a method of extracting a final watermark from original data repeatedly watermarked with the final watermark includes extracting watermarks from the watermarked original data, calculating a reliability of each of the extracted watermarks, and determining a final watermark based on the calculated reliability of each of the extracted watermarks.

According to an aspect of the invention, the calculating the reliability includes calculating a reliability of each bit of each of the extracted watermarks, and the determining the final watermark includes determining a bit value having a highest calculated reliability among the calculated reliabilities of the bit values of the extracted watermarks in the same digit as a bit value of the final watermark.

According to an aspect of the invention, the determining the final watermark includes selecting among the extracted watermarks the extracted watermark having a highest calculated reliability as the final watermark.

According to an aspect of the invention, the selecting the watermark includes selecting among the extracted watermarks the extracted watermark having the most bit values that are more reliable than the reliabilities of the bit values in counterpart extracted watermarks.

According to an aspect of the invention, the calculating the reliability of each bit includes determining the reliability of each of the bits of each of the extracted watermarks based on statistical characteristics of each of the bits of each of the extracted watermarks.

According to an aspect of the invention, the calculating the reliability of each bit includes obtaining a variance of mapping values of each of the bits of each of the extracted watermarks, and determining a lower reliability for a greater variance in the mapping values.

According to an aspect of the invention, the calculating the reliability of each bit includes obtaining a difference between a maximum and a minimum among the mapping values of each of the bits of each of the extracted watermarks, and determining a lower reliability for a greater difference between the maximum and the minimum among the mapping values of each of the bits of each of the extracted watermarks.

According to another aspect of the present invention, a method of extracting a final watermark from an image into which the final watermark is repeatedly inserted using mapping includes extracting mapping values from locations where the watermark was inserted, calculating an error of each of the extracted mapping values, and selecting as the final watermark the watermark that is inserted into a mapping value having a smallest error among the extracted mapping values.

According to an aspect of the invention, the extracting the mapping values includes extracting the mapping values by comparing an original image with the repeatedly watermarked image.

According to an aspect of the invention, the extracting the mapping values includes dextracting the mapping values based on the watermark repeatedly inserted into the original image and the corresponding inserted locations.

According to an aspect of the invention, the calculating the error comprises calculating a variance of each of the extracted mapping values regarding the inserted mapping values, and the selecting the watermark includes determining a bit value inserted into a mapping value having a smallest variance among the extracted mapping values as a bit value of the final watermark.

According to an aspect of the invention, the calculating the error includes obtaining a difference between a maximum and a minimum of each of the extracted mapping values, and the selecting the watermark includes determining a bit value inserted into a mapping value having a smallest difference between maximum and minimum values as a bit value of the final watermark.

According to an aspect of the invention, the calculating the error includes obtaining a difference between a maximum of a' and a minimum of b' in an extracted mapping value pair (a', b') (a'<b'), and the selecting the watermark includes determining a bit value inserted into a mapping value pair having a smallest difference between the maximum of a' and the minimum of b' as a bit value of the final watermark.

According to still another aspect of the present invention, an apparatus for extracting a final watermark from an image into which the final watermark is repeatedly inserted using mapping values includes an extractor to extract the mapping values from where the watermarks, a reliability calculator to calculate an error of each of the extracted mapping values, and a comparator to select as the final watermark the watermark inserted into the mapping value having a smallest error among the extracted mapping values.

According to an aspect of the invention, the extractor compares an original image with the repeatedly watermarked image and extracts the mapping values based on the result of the comparison.

According to an aspect of the invention, the extractor extracts the mapping values based on the watermark repeatedly inserted into the original image and the corresponding inserted locations.

According to an aspect of the invention, the reliability calculator calculates a variance of each of the extracted mapping values regarding the inserted mapping values, and the comparator determines a bit value inserted into a calculated mapping value having a smallest variance among the calculated mapping values of the extracted mapping values as the bit value of the final watermark.

According to an aspect of the invention, the reliability calculator obtains a difference between a maximum and a minimum of each of the extracted mapping values, and the comparator determines a bit value inserted into a mapping value having a smallest difference between corresponding maximum and minimum values as the bit value of the final watermark.

According to an aspect of the invention, the reliability calculator obtains a difference between a final maximum of a' and a minimum of b' in an extracted mapping value pair (a', b') (a'<b'), and the comparator determines a bit value inserted into a mapping value pair having a smallest difference between the maximum of a' and the minimum of b' as the bit value of the final watermark.

According to yet still another aspect of the present invention, an apparatus for extracting a final watermark from original data into which the watermark was repeatedly inserted includes an extractor to extract watermarks from the repeatedly watermarked original data, a reliability calculator to calculate a reliability of each of the extracted watermarks, and a comparator to determine a final watermark based on the calculated reliability of each of the extracted watermarks.

BRIEF DESCRIPTION OF THE DRAWINGS

The above and/or other features and advantages of the present invention will become more apparent and more readily appreciated by describing in detail exemplary embodiments thereof with reference to the accompanying drawings in which:

FIGS. 7A through 7C show a method of determining a final watermark according to an embodiment of the present invention.

DETAILED DESCRIPTION OF THE EMBODIMENTS

Figure 1A:
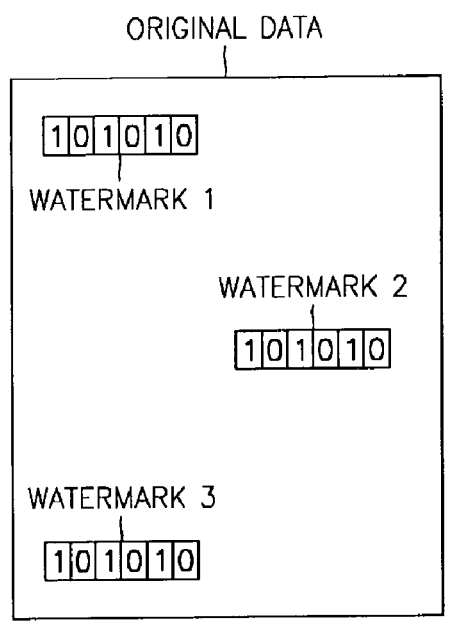
FIGS. 1A and 1B show a method of repeatedly inserting a watermark into original data and transmitting the original data.
Figure 1B:
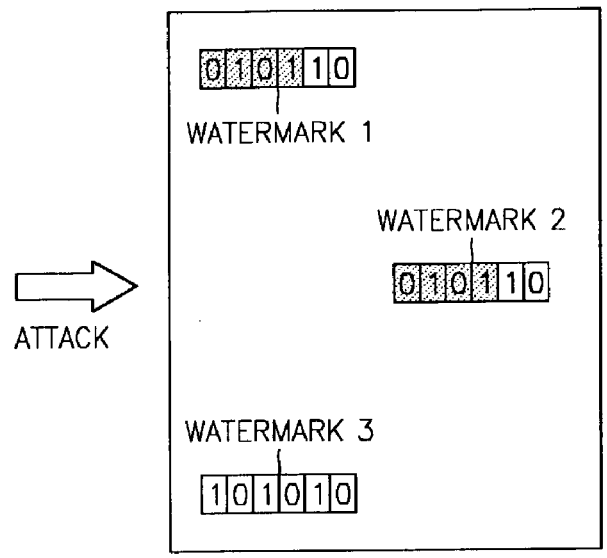

Hereinafter, the present invention will be described more fully with reference to the accompanying drawings in which embodiments of the present invention are shown, wherein like reference numerals refer to the like elements throughout. The embodiments are described below in order to explain the present invention by referring to the figures.

Figure 2:
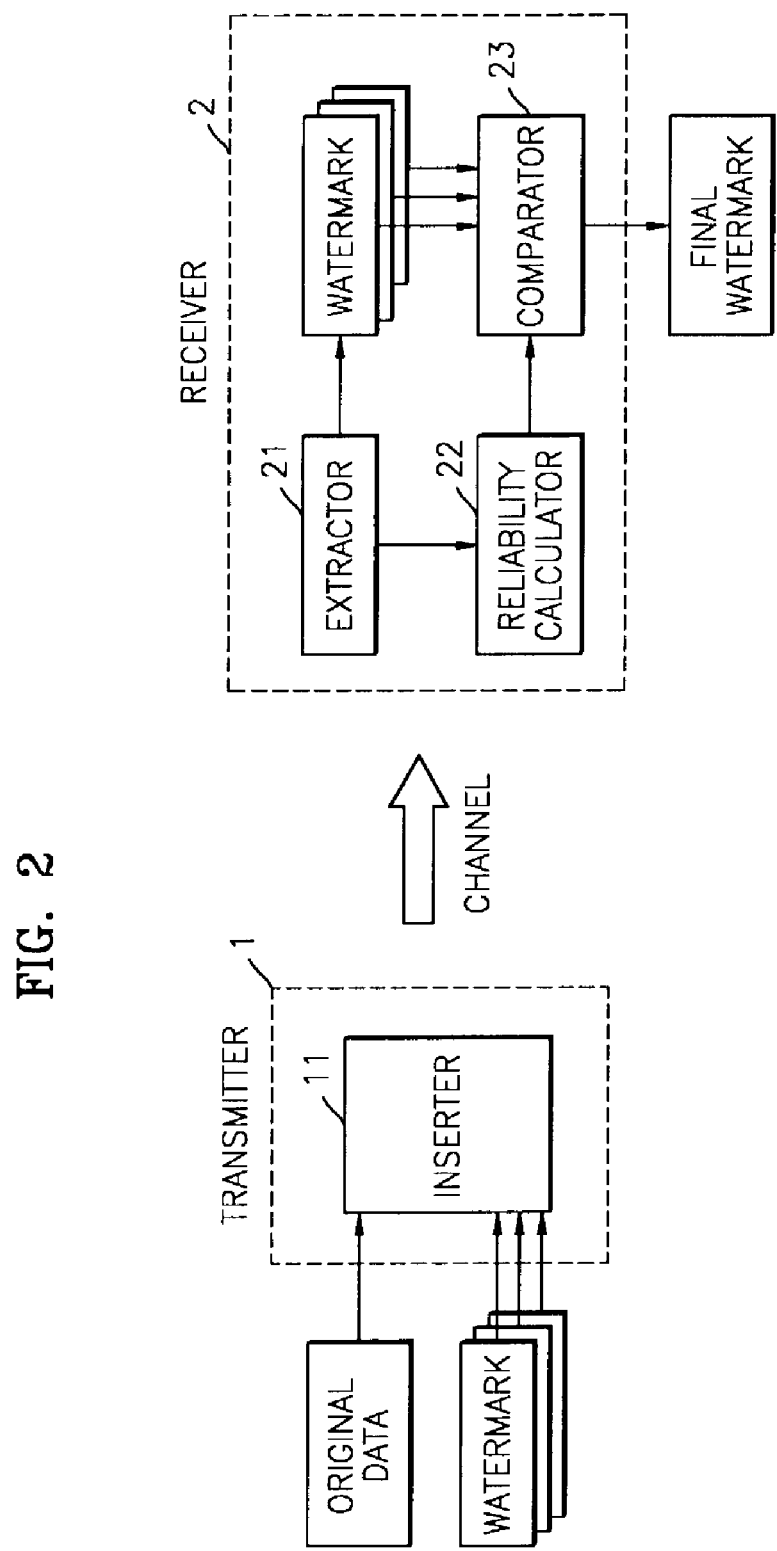
FIG. 2 is a schematic view of a system for transmitting and receiving watermarks according to an embodiment of the present invention.

FIG. 2 is a schematic view of a system which transmits and receives watermarks according to an embodiment of the present invention. Referring to FIG. 2, the system includes a transmitter 1 and a receiver 2. The transmitter 1 includes a watermark inserter 11. The watermark inserter 11 repeatedly inserts an original watermark into original data. In the present embodiment, original data is image data, and the watermark is inserted into the original data by using a mapping method, which will be described in greater detail later. The watermark inserter 11 is understood to insert the watermark into the original data in various ways, including conventional and future watermark insertion methods.

The receiver 2 includes an extractor 21, a reliability calculator 22, and a comparator 23. When the watermarked data is transmitted to the receiver 2 via a predetermined channel, the extractor 21 extracts a plurality of watermarks from the watermarked data. The reliability calculator 22 calculates the reliability of each of the extracted watermarks (i.e., the degree to which the extracted watermark correlates to the original watermark). Here, the method of calculating the reliability of each of the extracted watermarks will be described in greater detail later. The method of calculating the reliability of each of the extracted watermarks, however, is not limited to the one set forth herein. Rather, the reliability of each of the extracted watermarks can be obtained in various ways. The comparator 23 determines one of the extracted watermarks as a final watermark based on the calculated reliability of each of the extracted watermarks.

It is understood that the predetermined channel can be any mechanism by which data is transferred including, but not limited to, transmission across networks and/or transfer on recording media between the receiver 2 and the transmitter, such as transfers using recording media sent through mail systems.

Figure 3A:
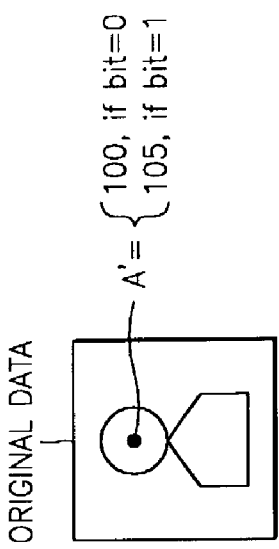
FIGS. 3A through 3C show a method of inserting a watermark using a watermark inserter according to an embodiment of the present invention.
Figure 3B:
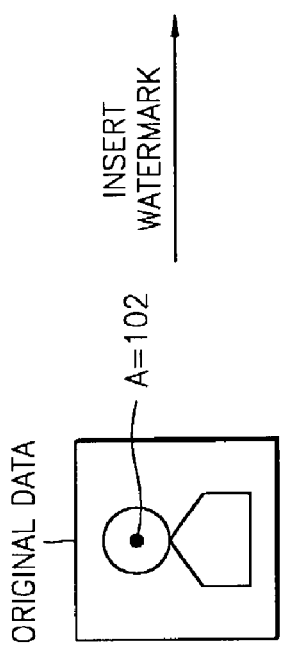
Figure 3C:
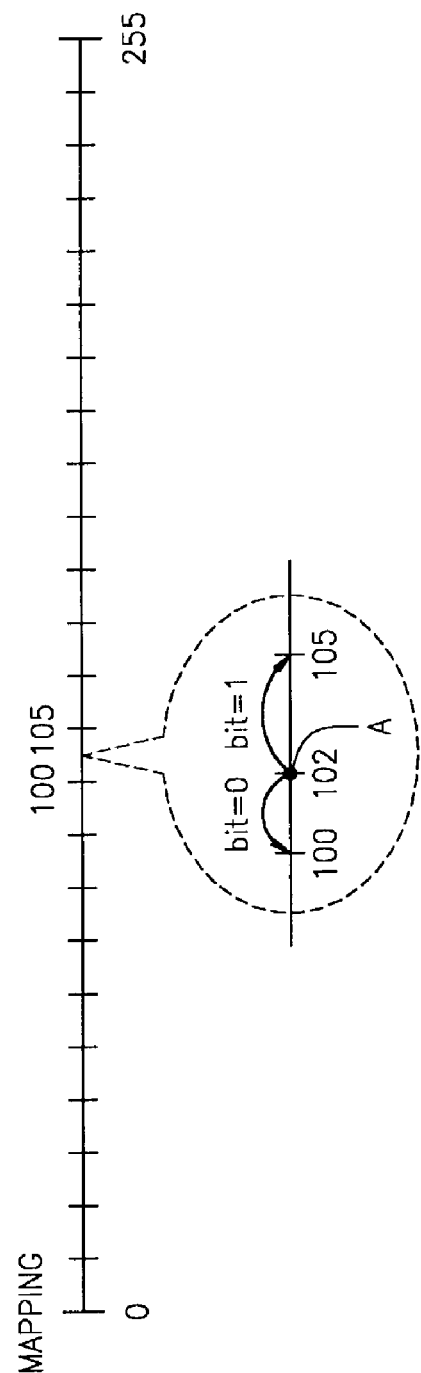

FIGS. 3A through 3C are diagrams illustrating a method of inserting a watermark using the watermark inserter 11 according to an embodiment of the present invention. In FIGS. 3A through 3C, the original data represents image data, and the original watermark is inserted into the original data using a mapping method represented by Equation (1) below:

$$\text{If } (W=1), \text{ then } A'=a \text{ else if } (W=0), \text{ then } A'=b \quad (1)$$

In Equation (1), W represents the original watermark, and A' represents a predetermined component of a watermarked image. In other words, if the watermark W has a bit value of 1, a component A of an original image is mapped at a. On the other hand, if the watermark W has a bit value of 0 the original image component A is mapped at b. Thus, A is replaced by A' having a value of a or b.

The mapping method can also be represented by Equation (2) below:

$$\text{If } (W=1 \text{ \& condition C is satisfied}), \text{ then } A'=a \text{ else}$$
$$\text{If } (W=0 \text{ \& condition D is satisfied}), \text{ then } A'=b \quad (2)$$

In Equation (2), W represents the watermark, and A' represents a component of the watermarked image. In other words, if the watermark W has a bit value of 1 and a condition C is satisfied, a component A of an original image is mapped at a. On the other hand, if the watermark W has a bit value of 0 and a condition D is satisfied, the original image component A is mapped at b. Thus, A is replaced by A', which is either a or b.

For example, let us assume that an original image consists of pixels in one of 256 colors (i.e., pixels having a value between 0 and 255 as shown in FIG. 3B). If a watermark having a bit value of 0 is inserted into a pixel A (A=102) of the original image as shown in FIG. 3A, then a component A' of a watermarked image has a value of 100. On the other hand, if a watermark having a bit value of 1 is inserted into the pixel A of the original image, then A' has a value of 105.

As shown in FIG. 3C, in the mapping method, a range of a series of values respectively representing components of an original image (for example, a range of 0-255) is divided into a predetermined number of sections of the same width. The component A of the original image where a watermark will be inserted is mapped at either a minimum or maximum value in a predetermined section where a value representing the component A belongs, depending on the bit value of the watermark. As shown in FIG. 3C, the range of values is divided into sections having a width of 5. If the watermark has a bit value of 0, the original image component A is mapped at 100. If the watermark has a bit value of 1, the original image component A is mapped at 105. Here, 100 and 105 are called mapping values. In this manner, a plurality of watermarks are inserted into the original image. In other words, the values of pixels at predetermined places of the original image can be replaced by mapping values. When a watermark is inserted into an image more than one time, it is preferable that the inserted watermarks are uniformly and/or randomly distributed over the original image. By doing so, it is possible to make the inserted watermarks less vulnerable to various attacks. However, it is understood that the watermark can be inserted into various places of the input image.

The extractor 21 of the receiver 2 figures out places of a watermarked image where watermarks are inserted by comparing an original image with the watermarked image and/or simply using information on the locations of the watermarks received from the transmitter 1. The extractor 21 then extracts the watermarks from the watermarked image. Where the watermarked image is attacked while being transmitted to the receiver 2 via a predetermined channel or is damaged simply due to data transmission errors, the extracted watermarks may include damaged bit values.

Figure 4A:
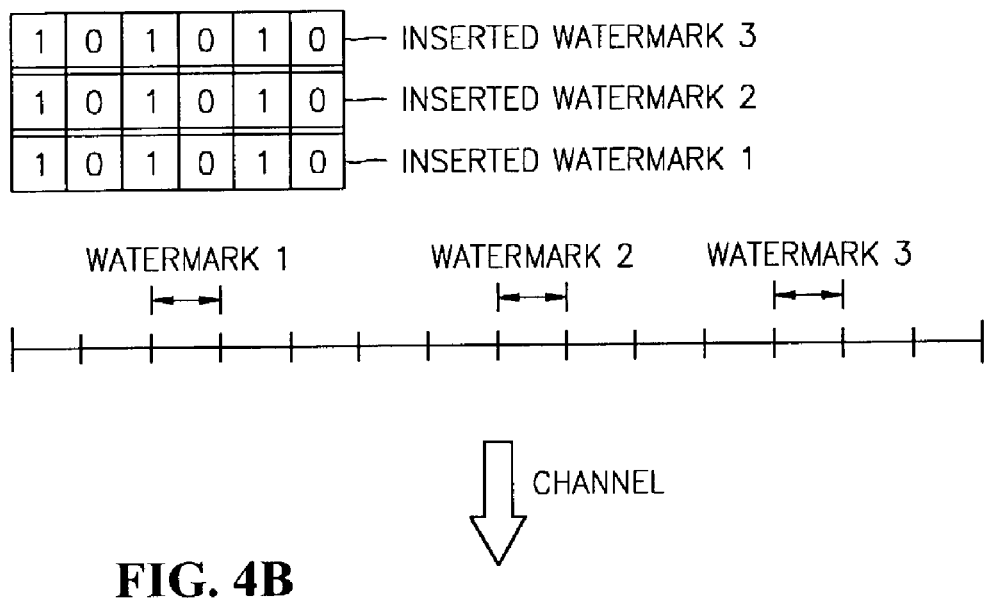
FIGS. 4A and 4B show a method of calculating a reliability using a reliability calculator according to an embodiment of the present invention.
Figure 4B:
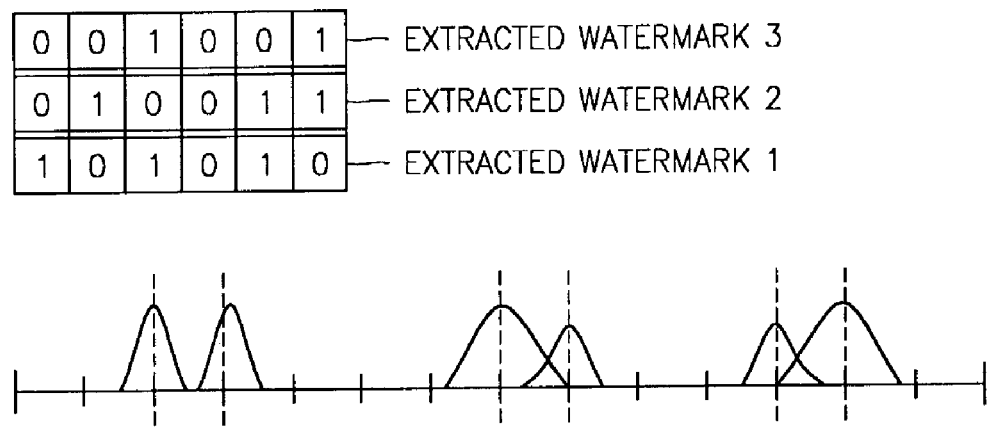

FIGS. 4A and 4B show a method of calculating reliability by using the reliability calculator 22 according to an embodiment of the present invention. Referring to FIG. 4A, the transmitter 1 inserts three watermarks 1 through 3 into components of an original image using the mapping method. The components where the watermarks 1 through 3 are inserted are mapped at either a minimum or maximum value in their corresponding sections. In other words, the components where the watermarks 1 through 3 are inserted are replaced by the mapping values, and then the watermarked image is transmitted via the transmission channel.

The mapping values may then be damaged due to attack against the watermarked image passing through the channel or simply due to data transmission errors. If the mapping values are damaged, they have a Gaussian distribution pattern. The more severely the mapping values are damaged, the greater the variance of the Gaussian distribution of the mapping values. Thus, the variance of the Gaussian distribution of the mapping values can be considered as a benchmark for the reliability of the mapping values. The reliability calculator 22 calculates and outputs a variance value of the Gaussian distribution of the mapping values, which is necessary to determine whether or not the mapping values are reliable.

Referring to FIGS. 4A and 4B, original watermarks 1, 2, and 3 inserted into an original image are "101010". As shown in FIG. 4B, while the original watermark 1 is correctly extracted from the original image without its bit values being inverted, some of the bit values of the original watermarks 2 and 3 are wrongly detected so that "010011" and "001001" are obtained as extracted watermarks 2 and 3, respectively. In particular, four bit values of the original watermark 2 and two bit values of the original watermark 3 are wrongly detected. In the case of using a conventional majority rule method to determine a final watermark, "001011" is determined as a final watermark, which indicates that two bit values of the original watermark "101010" are wrongly detected.

However, according to the present invention, a variance value of the distribution of mapping values is provided by the reliability calculator 22 as a benchmark for the reliability of the mapping values. Since the distribution of the mapping values of the watermark 1 has a minimum variance value, the watermark 1 (i.e., "101010") is determined as a final watermark. In particular, the watermarks 1, 2, and 3 are respectively inserted into different components of an original image. Bit values "1"s in a watermark are mapping at a predetermined value and bit values "0"s in the watermark are mapped at another predetermined value.

In the case of the watermarks 1, 2, and 3 as shown in FIG. 4B, six mapping values, six Gaussian distributions, and six variance values can be obtained. In addition, among bit values of an extracted watermark 1, three "1"s have reliabilities of the same degree, and three "0"s have reliabilities of the same degree. Both "1"s and "0"s of an extracted watermark 2 have the same reliability, and this is also applied to the watermark 3. As shown in FIG. 4B, since the Gaussian distribution of the mapping values of the bit values "1"s or "0"s of the extracted watermark 1 has a smallest variance value, the bit values "1"s and "0"s in the extracted watermark 1 are considered most reliable. Thus, the extracted watermark 1 (i.e., "101010") is determined as a final watermark.

In the present embodiment, all bit values constituting a watermark are inserted into components of an original image belonging to the same section. The bit values, however, may be inserted into components of the original image belonging to different sections so that they can be distributed over the original image. In addition, if all bit values in the same digit of a plurality of watermarks are mapped at the same value of the same section, mapping values of the bit values in the same digit of the watermarks have the same variance, and thus it is impossible to compare the reliabilities of the bit values with one another. Accordingly, bit values in the same digit of the extracted watermarks need to be mapped at at least two different mapping values. More preferably, the bit values in the same digit of watermarks are mapped at different mapping values.

Figure 5A:
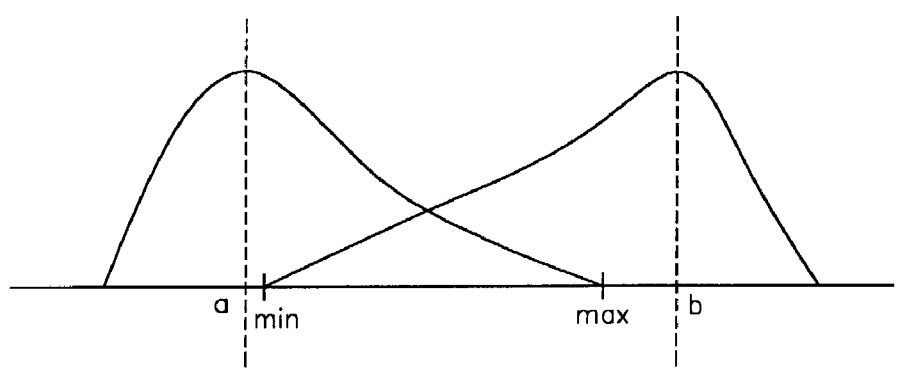
FIGS. 5A and 5B show a method of calculating a reliability using a reliability calculator according to another embodiment of the present invention.
Figure 5B:
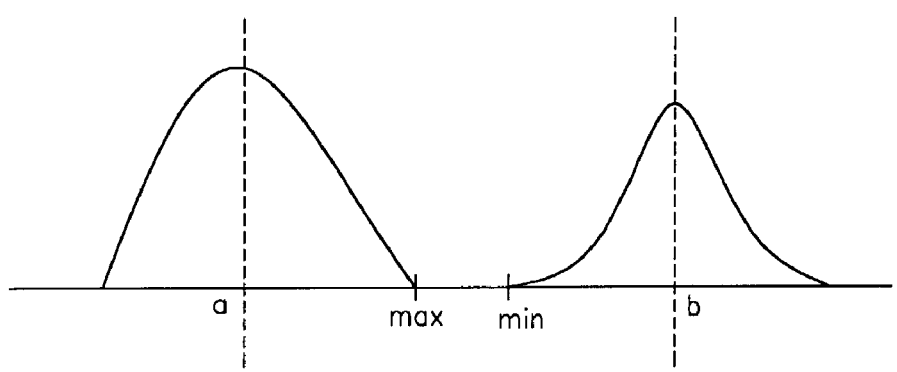

FIGS. 5A and 5B are graphs illustrating a method of calculating reliability using the reliability calculator 22 according to another embodiment of the present invention. In particular, FIGS. 5A and 5B shows distributions of mapping values 'a' and 'b' at the receiving terminal 2 when bit values "0" and "1" of a watermark inserted into an image are mapped at the mapping values 'a' and 'b', respectively. In the present embodiment, the reliability calculator 22 provides a difference between a maximum 'max' of the mapping value 'a' and a minimum 'min' of the mapping value 'b' (i.e., max−min) as a reference value necessary to figure out the degree to which the bit values "0" and "1" are reliable. In other words, as the watermarked image is more severely damaged, the maximum 'max' of the mapping value 'a' becomes greater, and the minimum 'min' of the mapping value 'b' becomes smaller. In addition, a greater difference between the 'max' and 'min' is considered to indicate a lower reliability of the mapping values "a" and "b". In FIG. 5A, max−min has a positive value, while its counterpart in FIG. 5B has a negative value. Accordingly, FIG. 5A has a lower reliability than FIG. 5B. In the present embodiment, bit values "1" and "0" of watermarks inserted into components of an original image belonging to the same section have the same reliability.

Figure 6:
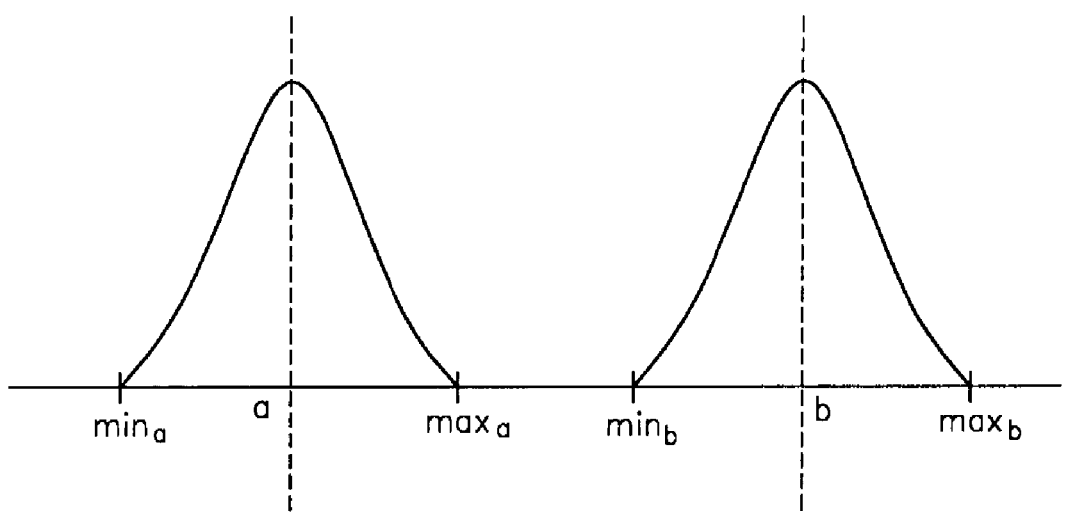
FIG. 6 shows a method of calculating a reliability using a reliability calculator according to still another embodiment of the present invention.

FIG. 6 is a diagram showing distributions of mapping values 'a' and 'b' at the receiving terminal 2 when bit values "0" and "1" of a watermark inserted into an original image are mapped at the mapping values 'a' and 'b', respectively. In the present embodiment, the reliability calculator 22 provides a difference between a maximum 'max_a' and a minimum 'min_a' of the mapping value 'a' (i.e., max_a−min_a) and a difference between a maximum 'max_b' and a minimum of the mapping value 'b' (i.e., max_b−min_b) as reference values necessary to determine the extent to which the mapping values "a" and "b" are reliable. In other words, as the watermarked image is more severely damaged, a difference between the maximum and minimum of each of the mapping values 'a' and 'b' becomes greater. The greater the difference, the lower the reliability of the mapping values "a" and "b".

Hereinafter, a method of determining a final watermark based on the structure of the watermark transmitting and receiving apparatus according to the present invention and the method of calculating reliability according to the present invention will be described in the following paragraphs.

FIGS. 7A through 7C show a method of determining a final watermark according to an embodiment of the present invention. Referring to FIG. 7A, the extractor 21 of FIG. 2 extracts J watermarks, each of which has I bits. Each bit of the extracted watermarks is represented by $W\_j(i)$ ($i$ is a value between 1 and I, and $j$ is a value between 1 and J). The reliability calculator 22 calculates the reliability of each of the bits each of the extracted watermarks.

Specifically, a reliability $C\_j(i)$ corresponds to a bit $W\_j(i)$. Where the values of predetermined components of an original image where a watermark is inserted belong to the same section and bit values inserted into the components are the same, the bit values have the same reliability level. As long as the values of the predetermined components belong to the same section, it is possible to make the bit values have the same reliability level by using the method of calculating reliability according to the present invention irrespective of whether or not the bit values inserted into the predetermined components of the original image are the same. The comparator 23 compares reliabilities of the bit values of the J extracted watermarks on a digit-by-digit basis, and then determines a bit value having a highest reliability to be the bit value of a final watermark. The comparison can be represented by Equation (2) below.

$$W\_\text{final}(i)=func\{MAX(C\_1(i),C\_2(i),C\_3(i),\ldots,C\_j(i),\ldots,C\_J(i))\} \quad (2)$$

In Equation (2), $W\_\text{final}(i)$ and $func\{\ \}$ represent the bit value of the final watermark and a function for extracting a watermark, respectively. Equation (2) can be rearranged into Equation (3) below.

$$W\_\text{final}(i)=func\{MIN(e\_1(i), e\_2(i), e\_3(i),\ldots,e\_j(i),\ldots,e\_J(i))\} \quad (3)$$

$$e\_1(i)=A\_1(i)-A\_1'(i)$$

$$e\_2(i)=A\_2(i)-A\_2'(i)$$

$$e\_j(i)=A\_j(i)-A\_j'(i)$$

$$e\_J(i)=A\_J(i)-A\_J'(i)$$

In Equation (3), $A\_j(i)$ represents information on an original image where a watermark is inserted, $A\_j'(i)$ represents information on a damaged watermarked image, $e\_j(i)$ represents an error between the watermarked image and the damaged watermarked image, and $func\{\ \}$ represents a function for extracting a watermark from $A\_j'(i)$.

In a mapping technique, $A\_j(i)$ is a mapping value of the bit $W\_j(i)$ and can be obtained based on the value and location of the bit $W\_j(i)$. When a watermark used to obtain the mapping value $A\_j(i)$ is different from the watermark inserted into the original image, a wrong mapping value is obtained, and an error occurs which may affect the error value $e\_j(i)$ between the watermarked image and the damaged watermarked image. Due to the error, it may be impossible to extract a watermark from a watermarked image even when the watermarked image is not damaged.

As the number of bits of a watermark or the number of times the watermark is inserted into the original image increases, the number of mapping values increases. Let us assume that a bit value of a watermark is mapped at 'a' or 'b' and $A\_a(i)$ and $A\_b(i)$ represent a group of mapping values represented by a value 'a' and a group of mapping values represented by a value of 'b', respectively. In a case where the watermarked image is not damaged, A_a(i) has an average value of 'a' and a variance value of 0, and A_b(i) has an average value of 'b' and a variance value of 0. On the other hand, if the watermarked image is damaged, A_a(i) and A_b(i) each have a Gaussian distribution pattern having its own average and variance. As described above, the more severely the watermarked image is damaged, the greater becomes the variance value of each of A_a(i) and A_b(i). Therefore, the variance value of A_a(i) or A_b(i) can be used as an error value e_j(i) necessary for determining the extent to which the mapping values 'a' or 'b' are reliable. The error value e_j(i) can be represented by Equation (4) below.

$$e\_j(i)=\text{variance}(A\_a(i)) \text{ or variance}(A\_b(i)) \quad (4)$$

The more severely damaged the watermarked image, the greater a difference between a maximum and a minimum of A_a(i). Therefore, the difference between the maximum and minimum of A_a(i) or A_b(i) can be used as an error value necessary to figure out the reliability of A_a(i) or A_b(i), and the error value can be represented by Equation (5) below.

$$e\_j(i)=\text{MAX}(A\_a(i))-\text{MIN}(A\_a(i)) \text{ or MAX}(A\_b(i))-\text{MIN}(A\_b(i)) \quad (5)$$

If there are a plurality of mapping value pairs, for example, (a_1, b_1), (a_2, b_2), . . . , (a_N, b_N), then A_a(i) and A_b(i), which have a mapping value pair (a_n, b_n), are treated as one group A_n, in which case the error value e_j(i) for allotting the same reliability to A_a(i) and A_b(i) can be represented by Equation (6) below.

$$e\_j(i)=\text{variance}(A\_a\_n(i))+\text{variance}(A\_b\_n(i)) \quad (6)$$

$$e\_j(i)=(\text{MAX}(A\_a\_n(i)) \text{ or MIN}(A\_a\_n(i)))-(\text{MAX}(A\_{i\,b}\_n(i)) \text{ or MIN}(A\_b\_n(i))) \quad (7)$$

In Equations (6) and (7), A_a_n represents a group having a mapping value a_n of a mapping value pair (a_n, b_n), and B_a_n represents a group having a mapping value b_n of the mapping value pair (a_n, b_n).

In the method of determining a final watermark according to the present invention, the reliability of each extracted watermark is calculated on a bit-by-bit basis, and a final watermark is determined based on the reliability of each of the extracted watermarks. In particular, the final watermark can be determined on a bit-by-bit basis in a manner where a bit value having a highest reliability among bit values for a predetermined digit of each of the extracted watermarks is determined as a bit value for the predetermined digit of the final watermark. Alternatively, among the extracted watermarks, the watermark having most of the most reliable bit values can be determined as the final watermark.

A final watermark can also be determined based on the reliability of each of the extracted watermarks, which can be represented by Equation (8) below.

$$W\_\text{final}=\text{func}\{\text{MAX}(C\_1,\ C\_2,\ C\_3,\ \ldots,\ C\_j,\ \ldots,\ C\_J)\} \quad (8)$$

In Equation (8), W_final, func{ }, and C_j represent a final watermark, a function for extracting a watermark, and reliability of a watermark W_j, respectively. In order to determine a final watermark in a majority rule manner, a watermark needs to be inserted into an image at least three times. However, according to the present invention, it is possible to determine a final watermark even though a watermark is inserted into an image only two times.

While not required in all aspects, it is understood that the method can be implemented through a computer implementing the method using a computer program encoded on a computer readable medium. The computer can be implemented as a chip having firmware, or can be a general or special purpose computer programmable to perform the method.

As described above, according to the present invention, it is possible to correctly extract a watermark from an image where the watermark has been repeatedly inserted, even when the repeatedly watermarked image is severely damaged.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of extracting a final watermark from original data into which an original watermark is repeatedly inserted, comprising:
    extracting watermarks from the watermarked original data;
    calculating a reliability of each bit of each of the extracted watermarks, the reliability indicating an extent to which the extracted watermark corresponds to the original watermark; and
    determining the final watermark based on the calculated reliability of each of the extracted watermarks by determining a bit value having a highest calculated reliability among the calculated reliabilities of the bit values of the extracted watermarks having a same digit as a bit value of the final watermark.

2. The method of claim 1, wherein the calculating the reliability of each bit comprises determining the reliability of each of the bits of each of the extracted watermarks based on statistical characteristics of each of the bits of each of the extracted watermarks.

3. The method of claim 2, wherein the calculating the reliability of each bit comprises:
    obtaining a variance of mapping values of each of the bits of each of the extracted watermarks; and
    determining that the reliability of the extracted watermark according to the least variance in the corresponding mapping values, the greater the variance indicating a lower reliability.

4. The method of claim 2, wherein the calculating the reliability of each bit comprises:
    obtaining a difference between a maximum and a minimum among the mapping values of each of the bits of each of the extracted watermarks; and
    determining the reliability according to the least difference, the greater the difference between the maximum and the minimum indicating a lower reliability.

5. A method of extracting a final watermark from original data into which an original watermark is repeatedly inserted, comprising:
    extracting watermarks from the watermarked original data;
    calculating a reliability of each of the extracted watermarks, the reliability indicating an extent to which the extracted watermark corresponds to the original watermark; and
    determining the final watermark based on the calculated reliability of each of the extracted watermarks by selecting among the extracted watermarks the one extracted watermark having the most bit values that are more reliable than counterpart bit values in the remaining extracted watermarks.

6. A method of extracting a final watermark from a repeatedly watermarked image where an original watermark is repeatedly inserted into an original image using a mapping method, the method comprising:
   extracting mapping values from locations on the image where the watermark is inserted;
   calculating an error of each of the extracted mapping values; and
   selecting as a final watermark a watermark inserted into a mapping value having a smallest error among the extracted mapping values.

7. The method of claim 6, wherein the extracting the mapping values comprises extracting the mapping values by comparing the original image with the repeatedly watermarked image.

8. The method of claim 6, wherein the extracting the mapping values comprises extracting the mapping values based on the watermark repeatedly inserted into the original image and the inserted locations.

9. The method of claim 6, wherein:
   the calculating the error comprises calculating a variance of each of the extracted mapping values regarding the inserted mapping values, and
   the selecting the watermark comprises determining as a bit value of the final watermark a bit value inserted into a mapping value having a smallest variance among the extracted mapping values.

10. The method of claim 6, wherein:
    the calculating the error comprises obtaining a difference between a maximum and a minimum of each of the extracted mapping values, and
    the selecting the watermark comprises determining as a bit value of the final watermark a bit value inserted into a mapping value having a smallest difference.

11. The method of claim 6, wherein the calculating the error comprises obtaining a difference between a maximum of a' and a minimum of b' in an extracted mapping value pair (a', b') (a'<b'), and the selecting the watermark comprises determining as a bit value of the final watermark a bit value inserted into a mapping value pair having a smallest difference between the maximum of a' and the minimum of b'.

12. An apparatus for extracting a final watermark from an image where an original watermark is repeatedly inserted using mapping, the apparatus comprising:
    an extractor to extract mapping values from where each of the watermarks is inserted;
    a reliability calculator to calculate an error of each of the extracted mapping values; and
    a comparator to select as the final watermark a watermark inserted into a mapping value having a smallest calculated error among the calculated errors of the extracted mapping values.

13. The apparatus of claim 12, wherein the extractor compares an original image with the repeatedly watermarked image and extracts the mapping values based on the result of the comparison.

14. The apparatus of claim 12, wherein the extractor extracts the mapping values based on the watermark repeatedly inserted into the original image and the corresponding inserted locations.

15. The apparatus of claim 14, wherein the reliability calculator calculates a variance of each of the extracted mapping values regarding the inserted mapping values, and the comparator determines as a bit value of the final watermark a bit value inserted into a mapping value having a smallest variance among the extracted mapping values.

16. The apparatus of claim 14, wherein the reliability calculator obtains a difference between a maximum and a minimum of each of the extracted mapping values, and the comparator determines as a bit value of the final watermark a bit value inserted into a mapping value having a smallest difference between its maximum and minimum.

17. The apparatus of claim 14, wherein the reliability calculator obtains a difference between a maximum of a' and a minimum of b' in an extracted mapping value pair (a', b') (a'<b'), and the comparator determines as a bit value of the final watermark a bit value inserted into a mapping value pair having a smallest difference between the maximum of a' and the minimum of b'.

18. An apparatus for receiving transmitted watermarked data having first and second watermarks, comprising:
    an extractor which extracts the first and second watermarks from the watermarked data;
    a reliability calculator which determines a first reliability of the first watermark and a second reliability of the second watermark, each of the first and second reliabilities indicating a degree of correspondence with an original watermark which was repeatedly inserted into the data prior to transmission; and
    a comparator which compares the first and second reliabilities to determine which of the first and second watermarks most closely corresponds to the original watermark; wherein
    the reliability calculator detects mapping values related to first and second locations in the data into which the corresponding first and second watermarks were inserted prior to transmission, determines the first and second reliabilities according to the first and second mapping values, detects a degree to which the first and second mapping values correspond to a Gaussian distribution, and determines the first and second reliabilities according to corresponding first and second variances in the Gaussian distribution.

19. The apparatus of claim 18, wherein the comparator determines as the final watermark the one of the first and second watermarks having a smaller one of the first and second variances.

20. The apparatus of claim 19, wherein the apparatus further comprises a transmitter which repeatedly inserts another watermark into another data to be transmitted.

21. An apparatus for receiving transmitted watermarked data having first and second watermarks, comprising:
    an extractor which extracts the first and second watermarks from the watermarked data;
    a reliability calculator which determines a first reliability of the first watermark and a second reliability of the second watermark and determines bit reliabilities of bits of the first and second watermarks, the bit reliabilities indicating a correspondence with corresponding bits of an original watermark, each of the first and second reliabilities indicating a degree of correspondence with an original watermark which was repeatedly inserted into the data prior to transmission; and
    a comparator which compares the first and second reliabilities to determine which of the first and second watermarks most closely corresponds to the original watermark by comparing the bit reliabilities of the first and second watermarks.

22. The apparatus of claim 21, wherein the comparator determines the final watermark to be the one of the first and second watermarks that includes the most bits having the highest bit reliability.

23. The apparatus of claim 22, wherein the comparator compares a reliability of each bit of the first and second watermarks as follows:

$$W\_final(i) = \text{func}\{MAX(C\_1(i), C\_2(i), C\_3(i), \ldots, C\_j(i), \ldots, C\_J(i))\},$$

W_j(i) is each bit of the extracted watermarks, i is a value between 1 and I, j is a value between 1 and J, J is a number of extracted watermarks, I is a number of bits in each extracted watermark, and C_j(i) is a reliability of a bit W_j(i).

24. An apparatus for receiving transmitted watermarked data having first and second watermarks, comprising:

- an extractor which extracts the first and second watermarks from the watermarked data, each of the first and second watermarks comprising a first and second bit;
- a reliability calculator which determines a first reliability of the first bit of the first and second watermarks and a second reliability of the second bit of the first and second watermarks, the first and second reliabilities indicating a correspondence with corresponding first and second bits of an original watermark which was repeatedly inserted into the data prior to transmission; and
- a comparator which compares the first and second reliabilities to determine which of the first bits of the first and second watermarks most closely corresponds to the first bit of the original watermark, and which of the second bits of the first and second watermarks most closely corresponds to the second bit of the original watermark so as to output a final watermark having the first and second bits found to be most reliable.

25. The apparatus of claim 24, wherein the comparator compares a reliability of each bit of the first and second watermarks as follows:

$$W\_final(i) = \text{func}\{MAX(C\_1(i), C\_2(i), C\_3(i), \ldots, C\_j(i), \ldots, C\_J(i))\},$$

W_j(i) is each bit of the extracted watermarks, i is a value between 1 and I, j is a value between 1 and J, J is a number of extracted watermarks, I is a number of bits in each extracted watermark, and C_j(i) is a reliability of a bit W_j(i).

26. The apparatus of claim 25, wherein the apparatus further comprises a transmitter which repeatedly inserts another watermark into another data to be transmitted.

* * * * *